United States Patent [19]

Girotti et al.

[11] 3,950,449

[45] Apr. 13, 1976

[54] PRODUCTION OF LIQUID POLYMERS HAVING A VERY HIGH VISCOSITY

[75] Inventors: Pierleone Girotti; Renato Tesei; Telemaco Floris, all of San Donato Milanese, Italy

[73] Assignee: Snam Progetti S.p.A., San Donato Milanese, Italy

[22] Filed: Mar. 12, 1974

[21] Appl. No.: 450,474

[30] Foreign Application Priority Data

Mar. 12, 1973  Italy .................................. 21456/73

[52] U.S. Cl. ......................... 260/683.15 D; 252/59
[51] Int. Cl.² ........................................... C07C 3/21
[58] Field of Search .......................... 260/683.15 D

[56] References Cited
UNITED STATES PATENTS

| | | | |
|---|---|---|---|
| 3,113,167 | 12/1963 | Sauer ......................... | 260/683.15 D |
| 3,151,181 | 9/1964 | Hewitt et al. .............. | 260/683.15 D |
| 3,467,639 | 9/1969 | Marconi et al. ............ | 260/93.7 |
| 3,798,284 | 3/1974 | Tesei et al. ................ | 260/683.15 D |

*Primary Examiner*—Paul M. Coughlan, Jr.
*Attorney, Agent, or Firm*—Ralph M. Watson

[57] ABSTRACT

A liquid polymer having a very high viscosity of between 250 cSt and 15,000 cSt at 210°F, is prepared by polymerizing one, or a mixture of more than one, n-alpha olefine represented by the formula R - CH = CH₂, in which R is an alkyl radical containing from 6 to 8 carbon atoms, in the presence of a catalyst system formed at a temperature in the range of 0°–150°C by a catalyst consisting of TiCl₄ and a polyiminoalane having the formula:

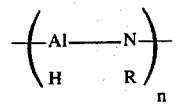

in which $n$ is a whole number not greater than 50 and R is an isopropyl radical, and in an atmosphere consisting essentially of an inert gas. The liquid polymer of very high viscosity so formed is useful as a lubricant.

10 Claims, No Drawings

PRODUCTION OF LIQUID POLYMERS HAVING A VERY HIGH VISCOSITY

This invention relates to a process for the preparation of liquid polymers having a very high viscosity, starting from mixtures of linear alpha-olefines obtained from a wax cracking and from single linear alpha-olefines having a general formula R-CH = CH$_2$, wherein R is an alkyl radical containing from 2 to 16 carbon atoms.

Processes for the polymerization of the alpha-olefines for the production of synthetic lubricants are well known, which utilize a catalytic system comprising a compound of a transition metal from groups IV to VIII of the periodic system and an aluminum compound which is a linear polyiminic polymer (polyiminoalane or PIA) under a hydrogen pressure from 2 up to 100 kg/cm$^2$, or in the presence of alkyl aluminum chlorides as regulators of the molecular weight.

The polyiminic aluminum compound has the formula:

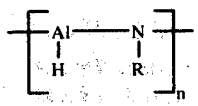

wherein n is a whole number not higher than 50, preferably comprised between 4 and 25, and R is an alkyl, aryl or cycloalkyl radical.

We have now found that using the same catalytic system TiCl$_4$/PIA, but operating in an atmosphere which is inert or only partially substituted with hydrogen and anyway up to a manometric pressure of hydrogen of 1 kg/cm$^2$, the polymerization reaction may go on normally obtaining high yields of more viscous polymers having a molecular weight which is remarkably higher and with a much lower percentage of dimers.

In the process of this invention it is possible to operate either in an inert atmosphere (e.g. nitrogen) obtaining polymers with very high viscosities or in atmosphere only partially substituted with hydrogen (i.e. under a pressure of H$_2$ wich may reach 1 kg/cm$^2$) obtaining high yields of polymers whose viscosity, under appropriate conditions, can reach very high values.

The ratio by weight of alpha-olefines/transition metal compound, generally TiCl$_4$ or also TiCl$_3$ VCl$_4$, VOCl$_3$ and so also the molar ratio polyiminoalane/transition metal compound, generally indicated as molar ratio H/Ti, are interdependent and vary mainly as a function of the n-alpha-olefines of the charge and of the relative impurities.

The ratio by weight of olefines/TiCl$_4$ may be in the range between 50 : 1 and 2000 : 1. The higher said ratio is the purer the feed alpha-olefins are. Generally by increasing the ratio by weight of olefines/TiCl$_4$, namely by decreasing the amount of transition metal compound, the H/Ti molar ratio also increases, the range of which may be between 1.3 and 5. The tendency of such ratio to increase is minor when we operate with feeds of high purity. It means that when feeds are used such as 1-decene, more concentrated with n-alpha-olefines than the mixtures of alpha-olefines coming from the wax cracking, amounts may be employed which are much smaller both as to TiCl$_4$ and as to the polyiminoalane.

If as feed an alpha-olefin of high purity is used, such as 1-decene, the polymers which are obtained generally present a viscosity much higher than do the polymers obtained from mixtures of alpha-olefines from wax cracking. Furthermore, with equal feed, the viscosity may be regulated by varying the reduction temperature of the TiCl$_4$ by means of polyiminoalane, namely the temperature at which the catalytic complex is formed: if such a temperature is high, for instance between 60° and 150°C and preferably between 80° and 120°C, the viscosity of the polymers is much higher than that of the polymers obtained when said temperature is lower, e.g. 0°C or 25°C.

After the formation of the catalytic complex has been carried out, the polymerization takes place, which is effected, for a fixed time, at a polymerization temperature in the range between 25° and 150°C, preferably in the range between 80° and 120°C. If the polymerization occurs at a low temperature, for instance at 25°C, the yields and so also the viscosity of the polymer are considerably lower.

The addition of the polyiminoalane to the olefins containing the TiCl$_4$, namely the reduction reaction of the TiCl$_4$, with the contemporaneous formation of the catalytic complex, according to the process of the invention, can be carried out also very slowly, drop by drop, for instance, over the period of an hour, i.e., over a period of 5 minutes to 60 minutes.

Under these conditions polymers are obtained having very high viscosities.

The formation of the catalytic complex is effected preferably in the same olefines namely "in situ" without any diluition with a solvent.

On the contrary if the olefines are diluted with a solvent or if the catalytic complex is "preformed" in the solvent, yields of polymer are obtained which are lower and resulting the viscosities of the polymers are also lower.

The hydrocarbons which can be used as solvents are: n-heptane, cyclohexane, benzene, chlorobenzene, and-/or their homologues or their mixtures.

The polymerization is carried out during a period in the range from 1–6 hours, a period of 3 hours being preferred.

The yields of converted product, namely devoid of the unreacted monomer, vary generally from 68 to 78% by weight if as feed of olefines a cut is used coming from wax cracking having a purity of n-alpha-olefines of 80%. Said yields increase up to 94% by weight if the feed is constituted by a purer product, such as n-alpha-olefines, for instance 1-decene.

The viscosities at 210°F of the polymers vary between 250 cSt and 15,000 cSt. The molecular weights (osmometric method) are between 1,000 and 3,000.

By using the catalytic system of the present invention, the reaction vessels must be well cleaned, dried and flushed with dry gas, e.g., nitrogen or hydrogen.

The alpha-olefines of the feed have to be subjected to a deaeration and to dehydration and must then be purified, as by means of a treatment with the same exhausted catalyst, or with anhydrous TiCl$_4$ or through percolation on silica and/or molecular sieves.

The composition and the characteristics of the alpha-olefines used as feed in the present invention are reported in tables I and II.

TABLE I

| Feed: mixture of commercial alpha-olefines $C_8 - C_{10}$ from wax cracking. | |
|---|---|
| | % b. w. |
| Olefines iso-$C_8$ | 0.82 |
| n-alpha-olefines $C_8$ | 14.42 |
| olefines iso-$C_9$ | 5.21 |
| n-olefine $C_9$ | 37.81 |
| olefines iso-$C_{10}$ | 9.95 |
| n-alpha-olefines $C_{10}$ | 28.18 |
| olefines iso-$C_{11}$ | 3.61 |
| | 100.00 |
| Total n-alpha-olefines | 80.41 % |
| Specific gravity of the mixture at 20°C | 0.741 |
| Refraction index, $n_D^{20}$ | 1.4217 |
| bromine number, g/100 g | 125 |

TABLE II

| Feed: 1-decene | |
|---|---|
| | % b. w. |
| Olefines iso-$C_{10}$ | 1.44 |
| n-alpha-olefines $C_{10}$ | 95.19 |
| olefines iso-$C_{11}$ | 3.37 |
| | 100.00 |
| Specific gravity at 20°C | 0.741 |
| Refraction index, $n_D^{20}$ | 1.4232 |
| Bromine number, g/100g | 114 |

Similarly to the alpha-olefines and to the possible solvents, all the components of the catalytic system must be maintained in an atmosphere of dry nitrogen.

For an illustrative, but not limitative purpose of the present invention, hereinafter examples of polymerizations are reported according to the invention itself.

EXAMPLES 1, 2, 3

Into a reactor having the capacity of 2 l. provided with a stirrer and with a jacket for the circulation of the thermo-regulating liquid accurately dried, deaerated and flushed with dried hydrogen was introduced 1 l. (g 741) of alpha-olefines from wax cracking in the range from $C_8$ to $C_{10}$, purified with $TiCl_4$, then 9.3 cc of 2.1 molar solution in hexane of $TiCl_4$, providing in this way the ratio by weight olefines/$TiCl_4$ of 200 : 1.

Successively after thermo-regulating the olefines and the $TiCl_4$ at the temperature of 80°C under stirring for a period of about 5 minutes we introduced a 1 molar solution of poly-(N-isopropyliminoalane) in hexane, in such amounts as to have molar ratios H/Ti of 2.5 in example 1, of 2.75 in example 2 and of 3.0 in example 3 (respectively cc 48.8, cc 53.7 and cc 58.6 of the 1.0 molar solution of PIA, poly-imino-alane). Then in the autoclave a 0.15 kg//cm² pressure, measured with manometer, of $H_2$ was exerted and a temperature of 80°C was maintained for all of the polymerization period which was of 3 hours.

The catalyst then was stopped first by adding methylalcohol, then concentrated HCl and finally water. The underlying aqueous phase was drained and more methyl alcohol was added, afterwards stirring was effected and the aqueous phase was drained repeating the operation till the aqueous phase was neutral.

The polymerization product was then distilled up to the top temperature of 175°C, obtaining the converted product having a boiling point higher than 175°C which was the polymer of the invention.

In the example 1 there was a yield of 72 % by weight of polymer, having a viscosity at 210° F of 1030 cSt, in the example 2 a yield of 78 % by weight and a viscosity at 210°F of 1160 cSt, in example 3 a yield of 75 % by weight and a viscosity at 210°F of 1450 cSt. The molecular weight, osmometric method, of the polymer of example 2, having the viscosity of 1160 cSt at 210°F was of 1350.

EXAMPLES 4 and 5

These were carried out under the same conditions as example 2 (olefines/$TiCl_4$ ratio of 200 : 1, molar ratio H/Ti of 2.75, formation temperature of the catalytic complex and of polymerization 80°C, time 3 Hours) with the only difference consisting in that the pressure of $H_2$ measured with the manometer was 1 kg/cm² in example 4, and 2 kg/cm² in example 5.

After treating the polymerization products as in the preceding examples a yield of polymer was obtained in Example 4 of 75 % b.w. with a viscosity of 1090 cSt at 210°F while in example 5 a yield of polymer of the 73 % b.w. with a viscosity of 250 cSt at 210°F.

Said results showed that the viscosity of the polymer remained high by operating up to the pressure of $H_2$ of 1 kg/cm², while it decreased considerably when a $H_2$ pressure of 2 kg/cm² was employed.

EXAMPLE 6

It was carried out under the same conditions as example 2 (olefines/$TiCl_4$ ratio of 200 : 1, molar ratio H/Ti of 2.75, formation temperature of the catalytic complex and of polymerization equal to 80°C, time 3 hours) with the variation that the hydrogen was substituted by a inert gas and it was operated under a pressure of nitrogen at the manometer of 0.15 kg/cm².

The polymer yield was of 56 % b.w. with a viscosity of 2050 cSt at 210°F.

By comparing these results with the ones of examples 2 it can be deduced that when nitrogen was substituted for hydrogen lower yields were obtained while the viscosity resulted higher.

EXAMPLES 7 and 8

They were carried out under the same conditions as example 2 (olefines/$TiCl_4$ ratio b.w. of 200 : 1 and molar ratio H/Ti equal to 2.75, hydrogen manometer pressure of 0.15 kg/cm²) with the difference that the reduction temperature of $TiCl_4$ on the part of the polyiminoalane, with relative formation of the catalytic complex was, 0°C in the in example 7 and 25°C in example 8.

Successively in both cases the temperature was allowed to rise to 80°C and the polymerization was carried out for a time of 3 hours.

In example 7 a yield of polymer of 70% with a viscosity of 305 cSt at 210°F was obtained in example 8 a yield of polymer of 73% with a viscosity of 660 cSt at 210°F.

These results showed that when the reaction of $TiCl_4$ reduction was effected at low temperature, polymers were obtained having a much lower viscosity and yields slightly lower than in the case wherein the reduction occurred at 80°C.

EXAMPLE 9

It was carried out under the same conditions as in example 2 (olefines/$TiCl_4$ ratio b.w. equal to 200 : 1, molar ratio H/Ti of 2.75, reduction temperature of $TiCl_4$ equal to 80°C, hydrogen manometer pressure of 0.15 kg/cm², time 3 hours) with the variation that the temperature of polymerization was of 120°C.

The polymer yield was of 79% with a viscosity of the polymer of 1100 cSt at 210°F.

Therefrom it was possible to deduce that the temperature of polymerization can also be 120°C.

EXAMPLE 10

It was carried out as in example 8 (olefines/TiCl$_4$ ratio b.w. equal to 200 : 1, molar ratio H/Ti equal to 2.75, reduction temperature of the TiCl$_4$ 25°C, hydrogen monometer pressure of 0.15 kg/cm$^2$, time 3 hours) with the variation that the polymerization temperature was 25°C.

The yield of polymer was 23 % with a viscosity of polymer of 790 cSt at 210°F.

Therefrom it was possible to deduce that at reduction temperatures of TiCl$_4$ of 25°C and of polymerization of 25°C, the yields and also even the polymer viscosities are considerably lower.

EXAMPLES 11, 12 and 13

They were carried out as in the example 2 with olefines/TiCl$_4$ ratio by weight equal to 200 : 1, at the reduction temperature of TiCl$_4$ and of polymeryzation of 80°C, pressure of H$_2$ 0.15 kg/cm$^2$. Molar ratios H/Ti and the volumes of the 1.0 molar solution of PIA were the following:

|            | Molar ratio H/Ti | Cubic centimeters of PIA 1.0 molar solution |
|------------|------------------|----------------------------------------------|
| Example 11 | 2.5              | 48.8                                         |
| Example 12 | 3.0              | 58.6                                         |
| Example 13 | 3.5              | 68.3                                         |

The variation with respect to the preceding examples was constituted by the fact that the addition of the solution of the polyiminoalane in the liter of olefines containing 9.3 cc of 1.0 molar solution of TiCl$_4$ occurred in a period of 1 hour.

In example 11 a yield of polymer of 64 % was obtained with a viscosity of 5330 cSt at 210°F. In example 12 a yield of 70 % b.w. with a viscosity of 8950 cSt at 210°F was obtained. In example 13 there was a yield of the 68 % b.w. with a viscosity of 14,900 cSt at 210°F.

From said results it is possible to deduce that the slow addition of the polyiminoalane increased very much the polymers viscosity and furthermore the viscosity increased remarkably with the increase of the H/Ti molar ratio.

EXAMPLES 14 and 15

They were carried out under the same conditions as example 2 (olefines/TiCl$_4$ ratio b.w. of 200 : 1, H/Ti molar ratio of 2.75) with the difference that the catalytic complex in the example 14 was formed in "situ" at 80°C in a liter of olefines diluted with 500 cc of n-heptane, while in example 15 it was "preformed", at 80°C, in 500 cc of n-heptane and successively 1 liter of olefines was added. In both cases the polymerization was effected at 80°C, the manometer pressure H$_2$ was of 0.15 kg/cm$^2$ and the time 3 hours.

In example 14 a yield of polymer of 65 % b.w. was obtained with a viscosity of 990 cSt at 210°F. In example 15 a polymer yield of 52 % b.w. was obtained with a viscosity of 750 cSt at 210°F.

From such results it was deduced that, in the presence of the solvent, the yields and the viscosities were lower and this mainly occurred if the catalytic complex was "preformed" before adding olefines.

EXAMPLES 16 and 17

They were carried out as in the preceding ones starting from 1 lt. of alpha-olefines C$_8$ – C$_{10}$ obtained from wax cracking but by operating with the following ratios:

| Ex. | Olefines/TiCl$_4$ ratio b.w. | cc of 2.1 molar-solution of TiCl$_4$ | H/Ti molar ratio | cc of PIA 1.0 molar solution |
|-----|------------------------------|---------------------------------------|-----------------|------------------------------|
| 16  | 50                           | 37.2                                  | 1.9             | 143.4                        |
| 17  | 350                          | 5.3                                   | 4.0             | 44.6                         |

As in the examples 1, 2 and 3 the catalyst was formed "in situ", the formation temperature of the catalytic complex and of polymerization was 80°C, the hydrogen measured through a manometer was 0.15 kg/cm$^2$, the time 3 hours.

In example 16 a polymer yield was obtained of 76 % with a viscosity of 1410 cSt at 210°F.

In example 17 the polymer yield was 68 % with a viscosity of 2460 cSt at 210°F. Said results in comparison with the ones of examples 1, 2 and 3 showed that with low ratios of olefines/TiCl$_4$ lower molar ratios H/Ti can be employed while with high molar ratios b.w. of olefines/TiCl$_4$ the molar ratio H/Ti must be higher.

In this case a polymer was obtained with higher viscosity but with lower yields.

EXAMPLES 18, 19, 20 and 21

They were carried by using as feed 1 l. of 1-decene (741 g) having a purity in n-alpha-decene of 95 %. The ratios between two components of the catalysts were the following:

| Ex. | Olefins/TiCl$_4$ ratio b.w. | cc of TiCl$_4$ 2.1 molar solution | H/Ti molar ratio | cc of PIA 1.0 molar solution |
|-----|------------------------------|------------------------------------|-----------------|------------------------------|
| 18  | 200                          | 9.3                                | 1.5             | 29.3                         |
| 19  | 500                          | 3.7                                | 2.1             | 16.4                         |
| 20  | 1000                         | 1.9                                | 3.5             | 17.3                         |
| 21  | 2000                         | 0.9                                | 4.5             | 8.8                          |

Like in example 8, the formation of the catalytic complex was carried out "in situ" at 25°C, afterwards the temperature was increased and maintained at 80°C for a time of 3 hours, the hydrogen pressure measured through a manometer was 0.15 kg//cm$^2$.

The obtained results were the following:

|            | Polymer yield % by weight | Polymer viscosity cSt at 210°F |
|------------|---------------------------|--------------------------------|
| Example 18 | 94                        | 4550                           |
| Example 19 | 94                        | 3150                           |
| Example 20 | 78                        | 1200                           |
| Example 21 | 32                        | 970                            |

By comparing the results of the examples 18, 19 and 20 with the ones of the example 8 it was deduced that by using a feed much purer in alpha-olefines, it was possible to use much lower amounts of catalyst, mainly of polyiminoalane, obtaining yields and viscosities much higher.

EXAMPLES 22 and 23

They were carried out by using as feed 1 liter of 1-decene (741 g) having a purity as to n-alpha olefines of 95%. The employed ratios were the following:

| Ex. | Olefins/TiCl$_4$ ratio b.w. | cc of 2.1 molar solution of TiCl$_4$ | H/Ti molar ratio | cc of PIA 1.0 molar solution |
|---|---|---|---|---|
| 22 | 100 | 9.3 | 1.3 | 25.4 |
| 23 | 500 | 3.7 | 1.8 | 14.0 |

The formation of the catalytic complex was carried out "in situ" at 80°C and the temperature of polymerization was also 80°C, the time of 3 hours, the hydrogen pressure measured through a manometer 0.15 kg/cm$^2$.

In example 22 a yield was obtained of the 93 % of polymer having a viscosity at 210°F of 12,240 cSt, in the example 23 a polymer yield of 92% with a viscosity at 210°F of 7540 cSt.

These results compared with the ones of examples 18 and 19, showed that by forming the catalytic complex at higher temperature (80°C instead of 25°C), lower amounts of PIA may be used, by obtaining high yields of polymer with very high viscosities.

We claim:

1. Process for the preparation of liquid polymers having a very high viscosity of between 250 cSt and 15,000 cSt at 210°F, through polymerization of a member of the group consisting of n-alpha olefins, and mixtures thereof, having the general formula R - CH = CH$_2$ wherein R is an alkyl radical containing from 6 to 8 atoms of carbon, in which:

the polymerization is carried out in the presence of a catalyst system formed by a catalyst consisting of TiCl$_4$ and an aluminum compound, which is a polyiminoalane having the formula

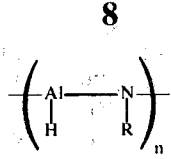

wherein n is whole number not higher than 50 and R is an isopropyl radical;

said catalyst system is formed at a temperature in the range of 0°–150°C and said polymerization occurs in a substantially inert atmosphere.

2. Process according to claim 1, wherein said substantially inert atmosphere includes hydrogen and has a manometric pressure of hydrogen not greater than 1 kg/cm$^2$.

3. Process according to claim 1, wherein the ratio by weight of alpha-olefines/TiCl$_4$ ranges from 50 to 2000.

4. Process according to claim 1, wherein the molar ratio between the polyiminoalane and the TiCl$_4$ is between 1.3 and 5.

5. Process according to claim 1, wherein the polymerization temperature is in the range between 25° and 150°C.

6. Process according to claim 1, wherein the catalytic complex is formed "in situ".

7. Process according to claim 6, wherein the polyiminoalane is added to the olefins containing the TiCl$_4$ over a period ranging from 5 minutes to 60 minutes.

8. Process according to claim 1, wherein said catalyst system is "preformed" in a solvent selected from the group consisting of n-heptane, cyclohexane, benzene, chlorobenzene and mixtures thereof.

9. Process according to claim 1, wherein said polymerization is carried out during a period in the range from 1 hour to 6 hours.

10. Process according to claim 1, wherein said mixture of n-alpha olefines comes from wax cracking.

* * * * *

UNITED STATES PATENT AND TRADEMARK OFFICE
CERTIFICATE OF CORRECTION

PATENT NO. : 3,950,449
DATED : April 13, 1976
INVENTOR(S) : Pierleone Girotti, Renato Tesei and Telemaco Floris It is certified that error appears in the above-identified patent and that said Letters Patent are hereby corrected as shown below:

First page in the Abstract, Correct the formula to read:

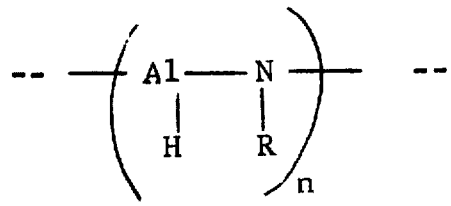

Signed and Sealed this

First Day of March 1977

[SEAL]

Attest:

RUTH C. MASON
Attesting Officer

C. MARSHALL DANN
Commissioner of Patents and Trademarks